(12) United States Patent
Hu et al.

(10) Patent No.: US 10,865,701 B2
(45) Date of Patent: Dec. 15, 2020

(54) COOLED TURBOCHARGER COMPRESSOR

(71) Applicant: Ford Global Technologies, LLC, Dearborn, MI (US)

(72) Inventors: Liangjun Hu, Bloomfield Hills, MI (US); Jianwen James Yi, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/201,991

(22) Filed: Nov. 27, 2018

(65) Prior Publication Data
US 2020/0165965 A1 May 28, 2020

(51) Int. Cl.
*F02B 29/04* (2006.01)
*F02B 39/00* (2006.01)

(52) U.S. Cl.
CPC ........ *F02B 29/0462* (2013.01); *F02B 39/005* (2013.01)

(58) Field of Classification Search
CPC .......................... F02B 29/0462; F02B 39/005
See application file for complete search history.

(56) References Cited

U.S. PATENT DOCUMENTS

| | | | |
|---|---|---|---|
| 5,395,212 A | 3/1995 | Anzai et al. | |
| 6,074,181 A * | 6/2000 | James | F04D 25/082 417/366 |
| 7,568,338 B2 | 8/2009 | Noelle et al. | |
| 9,482,240 B2 | 11/2016 | Gerard et al. | |
| 2004/0118389 A1* | 6/2004 | Shaffer | F02B 29/0462 123/563 |
| 2008/0232962 A1 | 9/2008 | Agrawal et al. | |
| 2009/0028730 A1* | 1/2009 | Radermacher | F04D 29/4206 417/423.8 |
| 2009/0145584 A1* | 6/2009 | Walsh | F04D 29/681 165/122 |
| 2011/0180026 A1 | 7/2011 | Heusler | |
| 2018/0163675 A1* | 6/2018 | Oshita | F02B 37/04 |

FOREIGN PATENT DOCUMENTS

CN 202707158 U 1/2013

OTHER PUBLICATIONS

Hu, J. et al., "Compressor Housing," U.S. Appl. No. 15/829,765, filed Dec. 1, 2017, 27 pages.
Hu, J. et al., "Water-Cooled Casing Treatment," U.S. Appl. No. 15/843,210, filed Dec. 15, 2017, 43 pages.

* cited by examiner

*Primary Examiner* — Brandon D Lee
(74) *Attorney, Agent, or Firm* — Geoffrey Brumbaugh; McCoy Russell LLP

(57) ABSTRACT

Methods and systems are provided for a compressor coolant chamber. In one example, a system comprising dividing the coolant chamber into two portions, a first portion adapted to couple to a second portion and shape a coolant chamber therebetween.

18 Claims, 6 Drawing Sheets

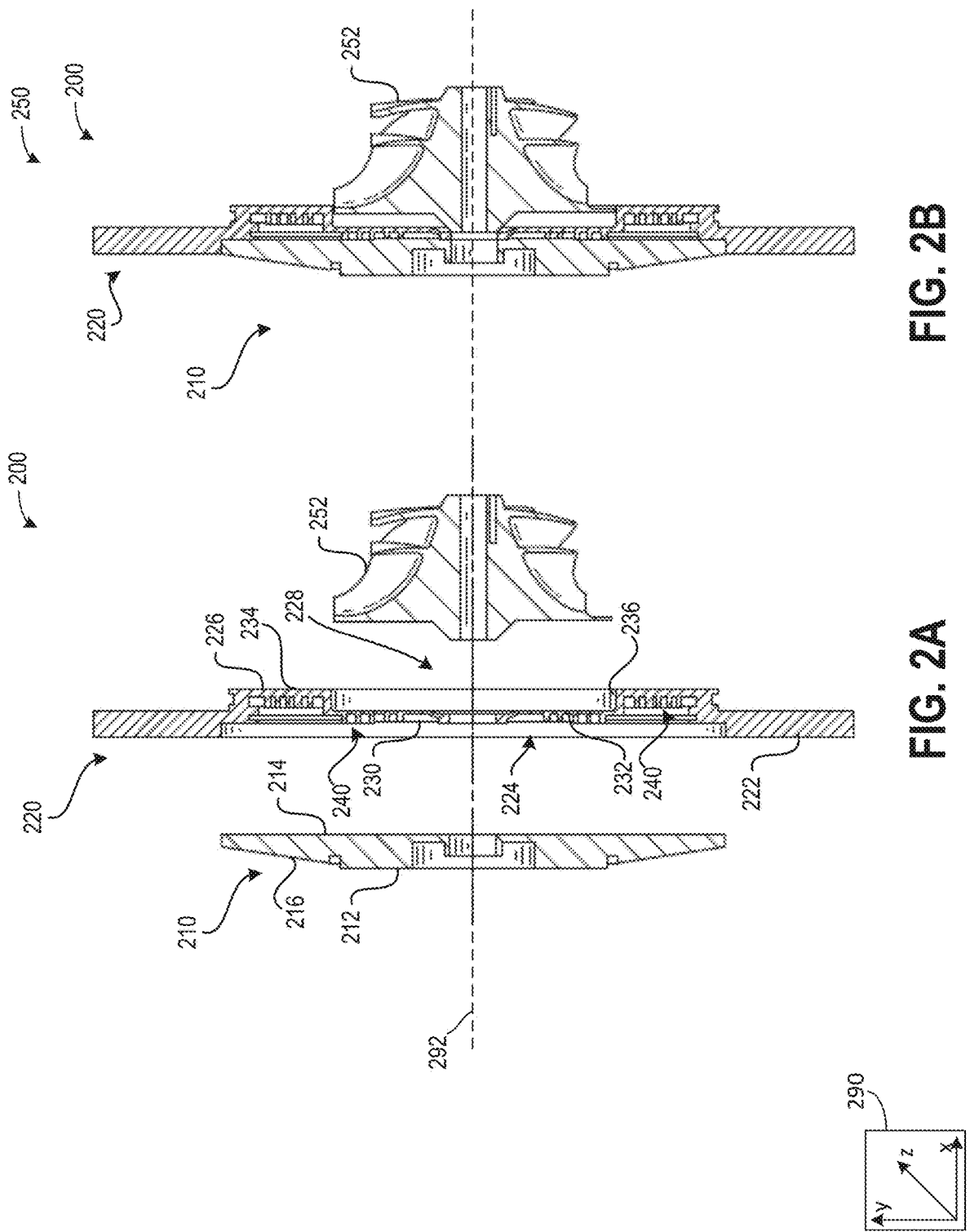

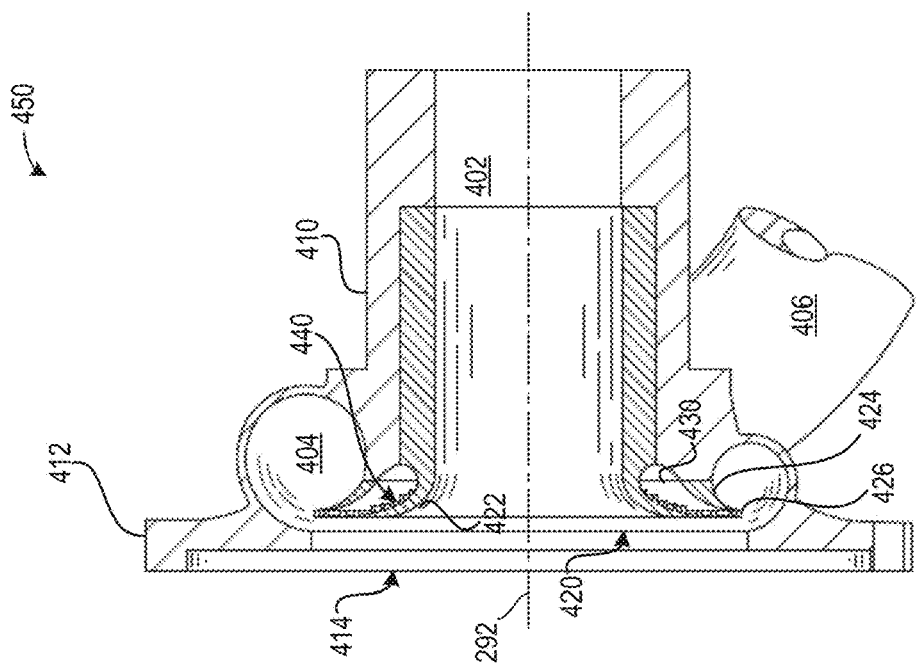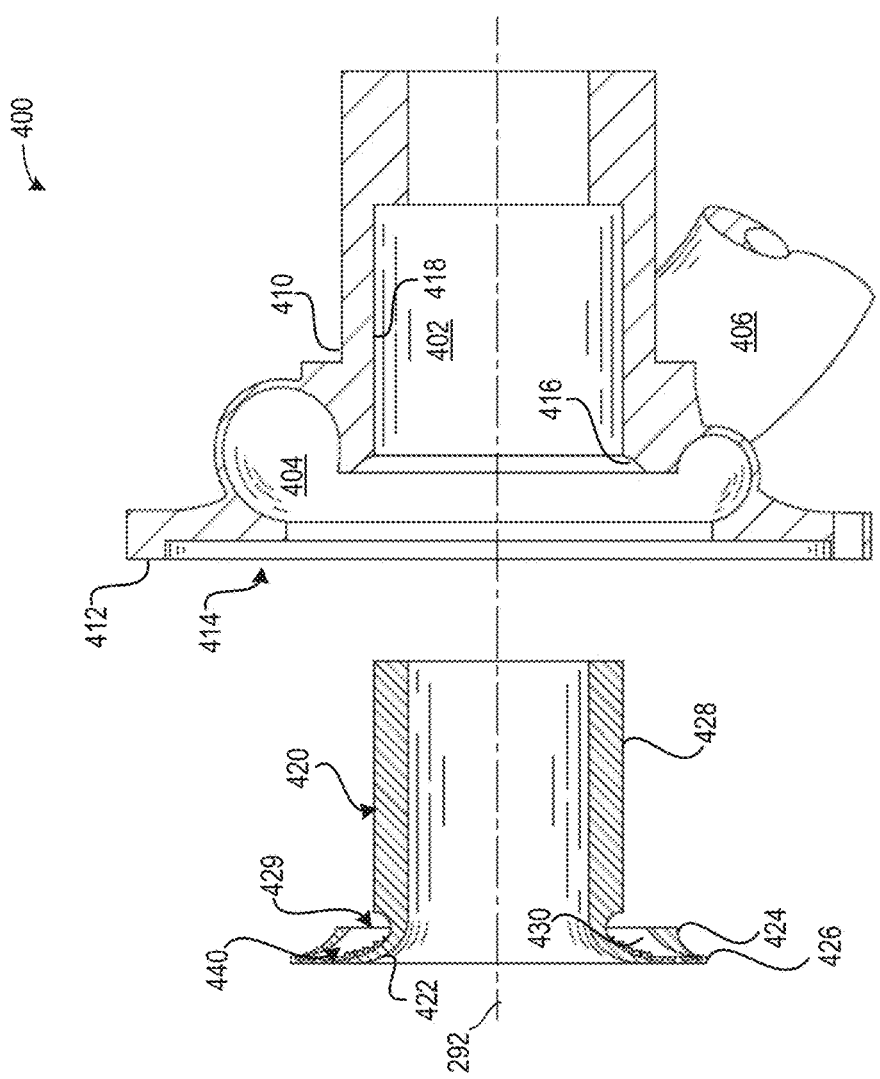
FIG. 4A
FIG. 4B

COOLED TURBOCHARGER COMPRESSOR

FIELD

The present description relates generally to systems for a turbocharger compressor of internal combustion engines with cooling.

BACKGROUND/SUMMARY

Engine may use a compressor to improve engine torque/power output density. The compressor may be coupled to a turbine via a drive shaft. Additionally or alternatively, the compressor may be coupled to an electric motor. As mechanical portions of the compressor rotate, temperatures may increase which may be combated via a cooling system.

One example approach is shown by Qing et al. in CN 202707158. Therein, a turbine comprises a volute water jacket and a bearing body water jacket. The bearing body water jacket may be coupled to the volute water jacket. The bearing body water jacket may cool the bearing system of the turbine while the volute water jacket may cool a volute of the turbine. Another example approach is shown by Heusler in U.S. 2011/0180026. Therein, a turbine comprises a double-wall, wherein a coolant jacket is arranged between the inner wall and the outer wall.

However, the inventors herein have recognized potential issues with such systems. As one example, the previous examples only cool a turbine. As such, compressor temperatures may not be adjusted. Even if the coolant jackets of the previous examples were incorporated into a compressor housing, issues would still arise. As one example, the cooling passage may increase a packaging size of a compressor housing, which may decrease fuel economy. Additionally, the coolant jackets of the previous examples may increase manufacturing costs. More specifically, it may be relatively expensive to cast the compressor housing with an internal cooling chamber. Furthermore, the shape of the coolant jackets may not provide sufficient cooling due to the geometry limitations as a result of casting, which may still experiences side effects associated with oil coking. As such, other coolant passage designs may be desired.

In one example, the issues described above may be addressed by a system comprising a compressor comprising a cooling element divided into a first portion and a second portion, wherein the first portion is a cap and the second portion comprises a coolant chamber comprising a plurality of fins. In this way, cooling effect provided by the coolant chamber may be enhanced.

As one example, separating the cooling element into two distinct portions may facilitate an easier manufacture of the compressor while providing a method for introducing a coolant chamber to various portions of the compressor. For example, the cooling element may be a back plate arranged between the compressor wheel and a turbine, wherein the back plate comprises the coolant chamber shaped to mitigate heat transfer between the turbine and the compressor. Additionally or alternatively, the cooling element may be a compressor housing, wherein the cooling chamber may be arranged along a portion of the housing. Fins may be arranged inside the coolant chamber. The cooling element may be 3D printed or can be manufactured through conventional casting by dividing the element into first and second portions. By doing this, oil coking and other unwanted occurrences may be blocked and/or combated with the cooling element(s) such that a compressor efficiency degradation can be avoided.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A illustrates an example of a back plate divided into two pieces.

FIG. 2B illustrates the back plate in an assembled configuration.

FIG. 4A illustrates a second embodiment of a compressor housing divided into two pieces.

FIG. 4B illustrates the second embodiment of the compressor housing in an at least partially assembled configuration.

FIGS. 2A-4B are shown approximately to scale, although other relative dimensions may be used, if desired.

DETAILED DESCRIPTION

Figure 1:
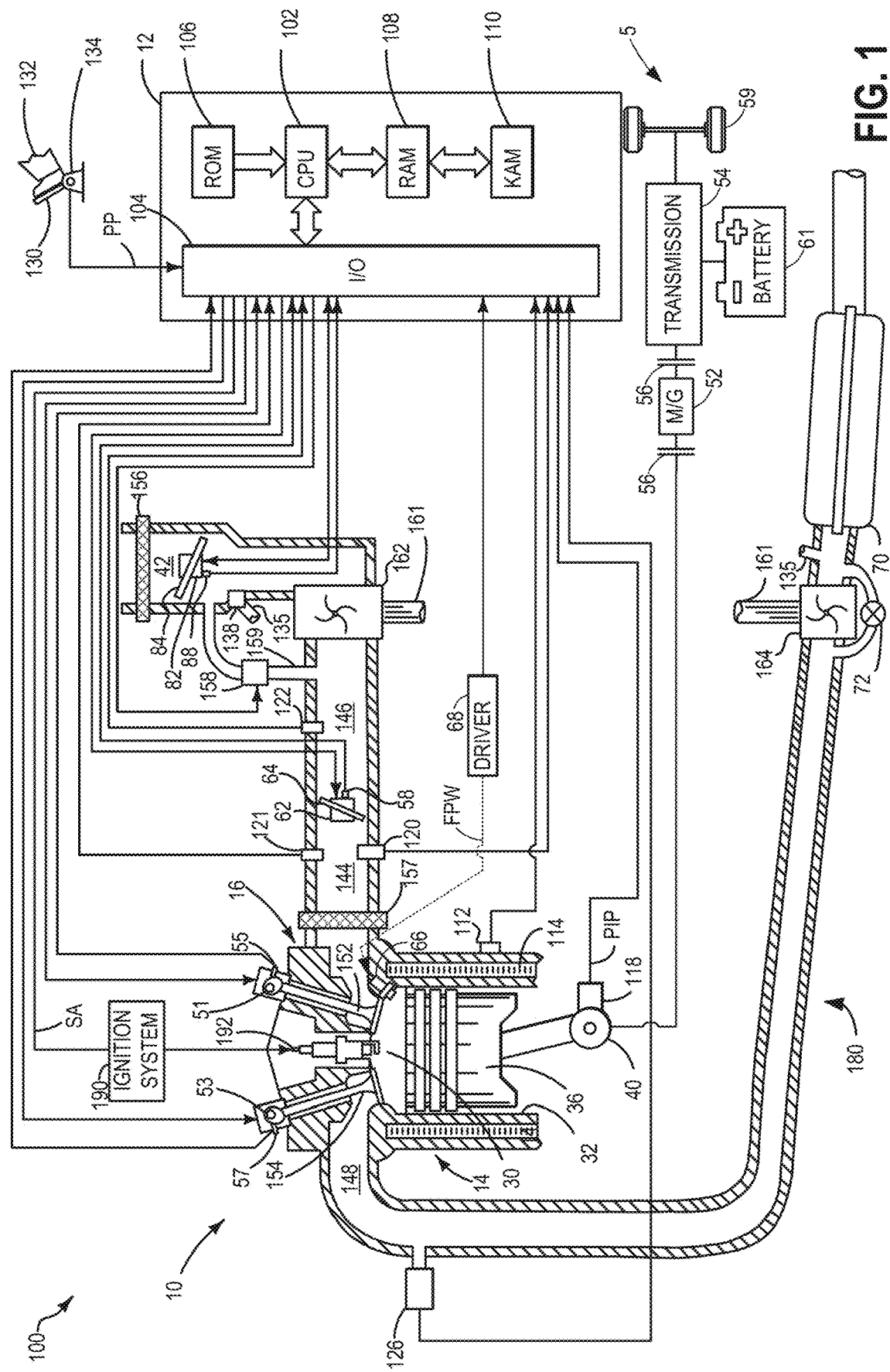
FIG. 1 illustrates a schematic of an engine included in a hybrid vehicle.

The following description relates to systems and methods for arranging a cooling chamber within a vicinity of a compressor housing. The compressor housing may be for a compressor included in a turbocharger or in a supercharger. An engine may be shaped to receive boost air from the compressor, regardless of its incorporation in the turbocharger and/or the supercharger, as shown in FIG. 1. FIG. 1 further shows the engine being arranged in a vehicle comprising a hybrid configuration, wherein the engine may receive assistance from an electric motor during some conditions.

The cooling chamber may be arranged within a compressor housing or adjacent to a compressor housing by dividing the cooling chamber into two pieces. The cooling chamber may be divided to include a first piece and a second piece, wherein the second piece comprises a region shaped to receive coolant (e.g., water or the like). The first piece may be coupled to the second piece during a manufacture of the compressor, wherein the first piece may be shaped to seal the second piece to block coolant from escaping the second piece. Examples of different portions of the compressor housing and/or back plate which may be divided into two pieces to comprise the cooling chamber are shown in FIGS. 2A, 2B, 3A, 3B, 4A, and 4B.

Figure 5:
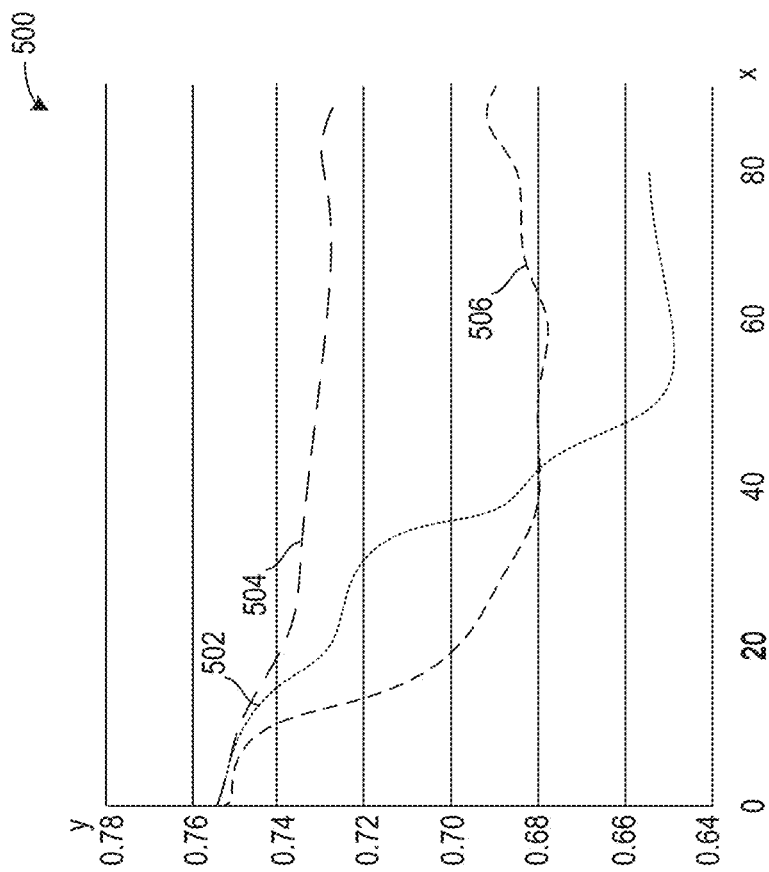
FIG. 5 shows a graph illustrating compressor efficiency over time for a previous example of a compressor and the compressor of the present disclosure.

Compressor cooling may be desired to mitigate oil coking onto surfaces within the compressor housing and onto portions of the compressor. In some case the engine may desire high boost to achieve a target torque and power. High compressor outlet temperatures may result and lead to degradation without sufficient. While some previous examples of compressor housings comprise a cooling chamber, these examples are manufactured as a single piece, which may limit a number of features that may be arranged in the cooling chamber to enhance cooling. Additionally, casting as a single piece may be relatively expensive compared to the method of casting described herein. By casting the cooling chamber as two pieces, a plurality of fins may be arranged in the cooling chamber, which may enhance a cooling effect provided by the cooling chamber. This may provide sufficient cooling throughout a wider range of engine operating conditions than single cast compressor housing cooling chambers, wherein sufficient cooling blocks oil from coking the compressor and its parts. A comparison between the two piece cooling chamber and a single piece cooling chamber of a previous example is shown in FIG. 5.

FIGS. 1-4B, and 6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The controller 12 receives signals from the various sensors of FIG. 1 and employs the various actuators of FIG. 1 to adjust engine operation based on the received signals and instructions stored on a memory of the controller. For example, adjusting operation of the electric machine 52 may occur based on feedback from ECT sensor 112. As will be described in greater detail below, the engine 10 and electric machine 52 may be adjusted such that their operations may be delayed based on one or more of a powertrain temperature, which may be estimated based on feedback from ECT sensor 112, and a distance between an intended destination and an electric-only operation range.

Turning it now to FIG. 2A, it shows an embodiment of a back plate 200 comprising at least two portions including a first portion 210 and a second portion 220. The back plate 200 may be used with compressor 162 of FIG. 1. The first portion 210 and the second portion 220 may be distinct, different portions separate from one another prior to a complete manufacture of the back plate 200 as shown in FIG. 2B. As such, the first and second portions 210 and 220 may be shaped to mate to one another as will be described in greater detail below.

An axis system 290 is shown comprising three axes, namely an x-axis parallel to a horizontal direction, a y-axis parallel to a vertical direction, and a z-axis perpendicular to each of the x- and y-axes. A central axis 292 is shown parallel to the x-axis. In some examples, additionally or alternatively, the central axis 292 may be parallel to a direction of intake air flow to a compressor.

The first portion 210 may be free of passages and openings. As such, the first portion 210 may be a solid continuous piece free of any inlets and outlets. In one example, the first portion 210 may be shaped to seal the second portion 220. The first portion 210 may comprise one or more of iron, aluminum, magnesium, copper, and the like. The first portion 210 may be cast or three-dimensionally printed.

The first portion 210 may comprise a first side 212 and a second side 214. The first side 212 may comprise a first diameter and the second side 214 may comprise a second diameter larger than the first. The first portion 210 may comprise a chamfered outer wall 216 extending from the first side 212 to the second side 214. Each of the first and second sides 212, 214 may be flat and flush such that they are free of protrusions and indentations, thereby allowing the first and second sides 212, 214 to be mated to other components of a compressor or other device.

The second portion 220 may comprise a first side 222 and a second side 226. The first side 222 may comprise a ring-shape. Surfaces of the first side 222 may flat and flush such that they are free of protrusions and indentations. The first side 222 may comprise an inner circular opening 224 having a third diameter. The third diameter may be sized based on the second diameter of the second side 214 of the first portion 210 such that the second side 214 of the first portion 210 may fit within the circular opening 224. In this way, the second side 214 may be in face-sharing contact with interior surfaces of the first side 222 of the second portion 220.

The second side 226 of the second portion 220 may comprise a ring-shape similar to a ring shape of the first side 222. An inner circular opening 228 of the second side may be concentric with the inner circular opening 224 of the first side 222 about the central axis 292. A fourth diameter of the inner opening 228 may be smaller than the third diameter of the inner opening 224. Thus, the inner opening 228 of the second side 226 may be smaller than the inner opening 224 of the first side 222. The second side 226 may be free of protrusions and indentations such that the second side 226 is flush.

A coolant chamber 230 may be arranged between the first side 222 and the second side 226. The coolant chamber 230 may be disc-shaped. A diameter of the coolant chamber 230 may be between diameters of the first side 222 and the second side 226. In the example of FIG. 2A, the coolant chamber 230 is open to an ambient atmosphere via the inner opening 224.

The coolant chamber 230 may comprise a first surface 232 and a second surface 234 arranged perpendicularly relative to the central axis 292. The first surface 232 and the second surface 234 may be parallel to one another while being axially misaligned. That is to say, the first surface 232 may be closer to the first side 222 of the second portion 220 than the second surface 234 and the second surface 234 may be closer to the second side 226 of the second portion 220 than the first surface 232. A connecting surface 236 may be physically coupled to each of the first surface 232 and the second surface 234. In one example, the connecting surface 236 is physically coupled to an outermost diameter of the first surface 232 and to an innermost diameter of the second surface 234. The connecting surface 236 may be arranged perpendicularly to the first and second surfaces 232, 234 and parallel to the central axis 292.

The coolant chamber 230 may comprise a plurality of fins 240. The plurality of fins 240 comprise a plurality of shapes including but not limited to rectangular, circular, triangle, square, and the like. In one example, the plurality of fins 240 comprise a circular shape, and where a cross-section of a fin of the plurality of fins 240 taken parallel to the central axis 292 comprises a rectangular shape. Thus, each fin of the plurality of fins 240 may extend continuously and circumferentially such that the plurality of fins 240 are concentric relative to the central axis 292. In some examples, each fin of the plurality of fins 240 may be radially spaced apart from one another, wherein the radially spacing may be uniform such that the plurality of fins 240 are symmetrically arranged. Additionally or alternatively, the plurality of fins 240 may be asymmetrically arranged without departing from the scope of the present disclosure.

In some examples, additionally or alternatively, the plurality of fin 240 may be discontinuous such that they extend for only a portion of a circumference of the second portion 220. In this way, two or more fins of the plurality of fins may be arranged along a single circumference.

Each of the first surface 232 and the second surface 234 may comprise an equal number of fins of the plurality of fins 240. In one example, the first surface 232 and the second surface 234 each comprise five fins. Thus, the coolant chamber 230 may comprise a total of 10 fins. It will be appreciated that the first surface 232 may comprise more or fewer fins than the second surface 234 without departing from the scope of the present disclosure. Additionally or alternatively, the first surface 232 and the second surface 234 may comprise numbers of fins different than five, for example, they may each comprise two, three, four, six, seven, eight, or so on numbers of fins.

The plurality of fins 240 may extend from a region of the first surface 232 proximal to the central axis 292 to a region of the second surface 234 proximal to an outer circumference of the coolant chamber 230. The outer circumference of the coolant chamber 230 may be proximal to an outer circumference of the second side 226. Each fin of the plurality of fins 240 may comprise a different diameter, wherein the difference between the diameters spaces each of the fins away from adjacent fins. In this way, adjacent fins may not touch.

The plurality of fins 240 may increase a surface area of the second portion 220. Thus, a cooling effect provided by coolant arranged in the coolant chamber 230 may be increased relative to cooling chambers free of the plurality of fins 240. By increasing the cooling effect, oil coking in the compressor (e.g., compressor 162 of FIG. 1) may be blocked. A comparison between a previous example of cooling provided by coolant in a compressor and a cooling chamber comprising the plurality of fins 240 is shown in FIG. 5.

Turning now to FIG. 2B, it shows an embodiment 250 of the back plate 200 in an assembled position. As shown, the first portion 210 may be physically coupled to the second portion 220. More specifically, the second side 214 of the first portion 210 may be shaped to mate with the inner opening 224 of the first side 222 of the second portion 220. The first surface 232 may press against surfaces of the second side 214 such that a combination of the second side 214 and the first surface 232 may seal the coolant chamber 230 from the ambient atmosphere.

The first portion 210 may be physically coupled to the second portion 220 with one or more bolts and a sealing ring (e.g., a rubber ring) arranged therebetween. Additionally or alternatively, the first portion 210 may be physically coupled to the second portion 220 via adhesives, fusions, and/or welds. In some examples, the first portion 210 may be press fit into the second portion 220.

The second portion 220 may be further shaped to couple to a compressor blade 252. The inner opening 228 of the second side 226 of the second portion 220 may be shaped to receive the compressor blade 252. As such, the coolant chamber 230 may be arranged between the compressor blade 252 and a turbine in one example configuration.

Figure 3B:
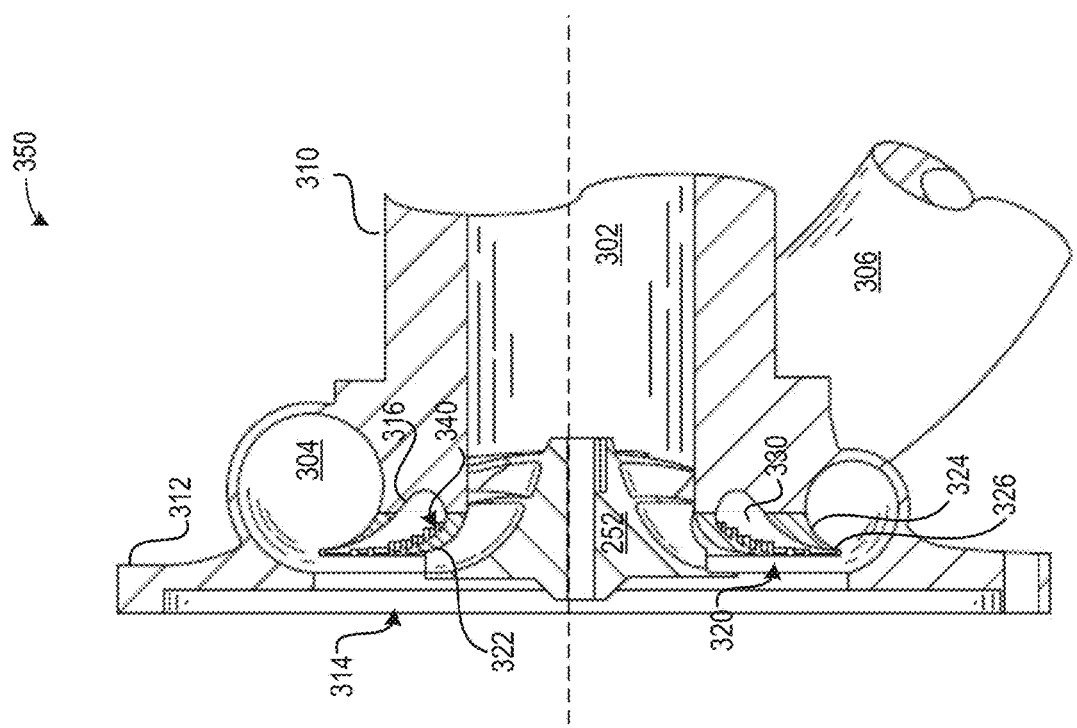
FIG. 3B illustrates the first embodiment of the compressor housing in an at least partially assembled configuration.
Figure 3A:
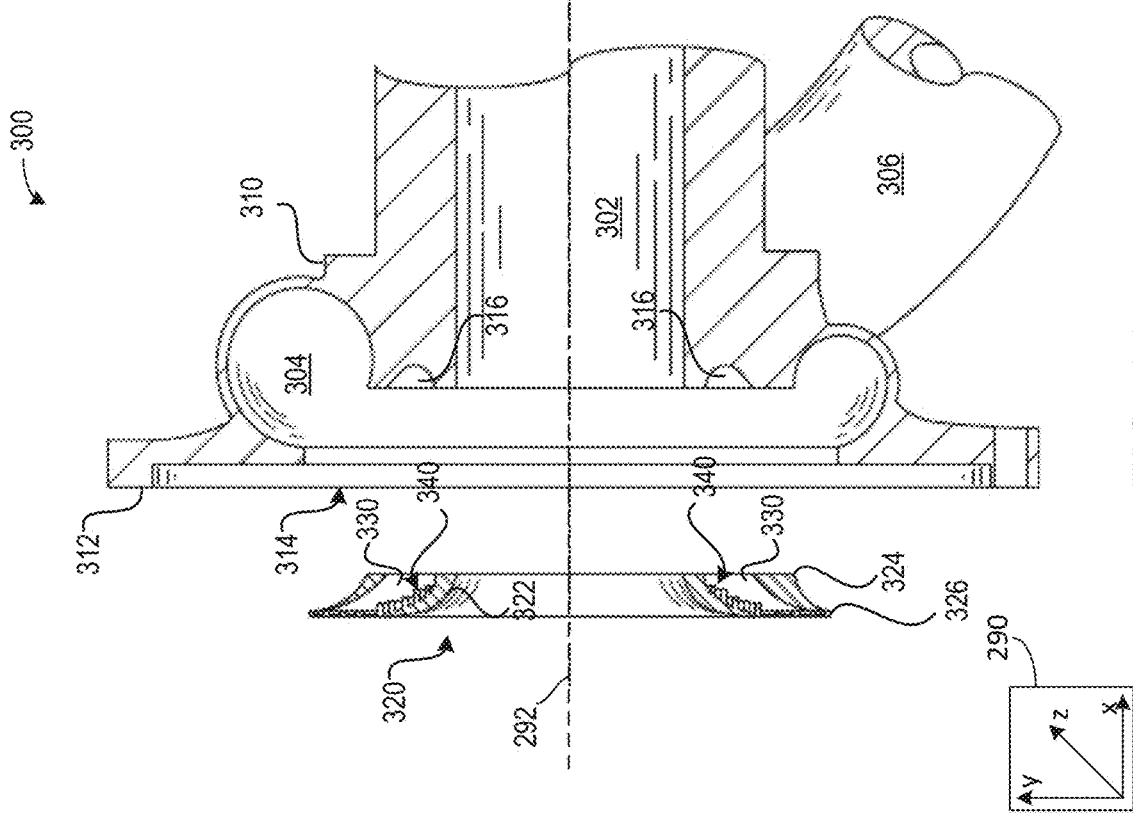
FIG. 3A illustrates a first embodiment of a compressor housing divided into two pieces.

Turning now to FIG. 3A, it shows an embodiment of a compressor housing 300. The compressor housing 300 may be used as a housing for the compressor 162 of FIG. 1. Additionally or alternatively, the compressor housing 300 and the back plate 200 of FIGS. 2A and 2B may be used in conjunction with a single compressor, such as the compressor 162 of FIG. 1 without departing from the scope of the present disclosure. Thus, a compressor comprising the back plate 200 and the compressor housing 300 may comprise two or more coolant chambers, as will be described herein. Components previously introduced may be similarly numbered in FIG. 3A and in subsequent figures.

The compressor housing 300 may be shaped to house a compressor blade, such as the compressor blade 252 shown in FIGS. 2A, 2B, and 3B. The compressor housing 300 may be further shaped to direct air to the compressor blade 252 via inlet 302. The inlet 302 may admit intake air to the compressor blade 252, wherein the compressor blade 252 may compress the intake air and direct the compressed air to a volute 304. The volute 304 may be arranged radially outside of the compressor blade 252 and may direct the compressed air away from the compressor housing 300 to an intake manifold or other engine component via an outlet 306.

The compressor housing 300 may comprise two portions including a first portion 310 and a second portion 320. The first portion 310 may correspond to the portion of the compressor housing 300 shaped to house the inlet 302, the volute 304, and the compressor blade 252. Additionally, the first portion 310 may comprise an extreme end 312 shaped to receive a back plate, such as back plate 200 of FIGS. 2A and 2B. More specifically, the extreme end 312 may be shaped to receive the second side 226 of the second portion 220. In one example, a cross-section of the extreme end taken in a direction parallel to intake air flow may be L-shaped, wherein the L-shape extends 360 degrees about the central axis 292. The extreme end 312 may comprise a toroid and/or ring shape sized such that the second side 226 of the second portion 220 may be fitted into an opening 314 arranged along the central axis 292. In this way, outer surfaces of the second side 226 may be pressed against interior surfaces of the extreme end 312.

The second portion 320 may comprise a toroid shape, wherein a cross-section of the second portion 320 taken along a plane perpendicular to the central axis 292 may be trapezoid shaped. As such, the second portion 320 may be similar to a trapezoid rotated 360 degrees about an axis while spacing the trapezoid from the axis. It will be appreciated that the second portion 320 may comprise other cross-sectional shapes such as triangular, square, rectangular, pentagonal, parallelogram, and the like.

The second portion 320 may comprise an inner surface 322 and an outer surface 324. Diameters of the inner surface 322 and the outer surface 324 may increase from an upstream end to a downstream end relative to a direction of intake air flow. A diameter of the inner surface 322 may be less than a diameter of the outer surface 324. Each of the inner surface 322 and the outer surface 324 may curve away from the central axis 292. In one example, a magnitude of curvature of the inner surface 322 may be greater than a curvature of the outer surface 324, such that the inner surface 322 is more curved than the outer surface 324. It will be appreciated that in some examples the outer surface 324 may be more or equally curved to the inner surface 322.

The inner surface 322 and the outer surface 324 may intersect at an extreme end 326 of the second portion 320. The extreme end 326 may be hermetically sealed such that gases and liquids may not flow therethrough. The extreme end 326 may extend into the volute 304 where compressed air may flow in contact therewith.

The second portion 320 may comprise a coolant chamber 330 arranged therein. The coolant chamber 330 included in only the second portion 320 may comprise a leaf shape. The coolant chamber 330 may interface with a recess 316 of the first portion 310. That is to say, a volume of the coolant chamber 330 arranged in the second portion 320 may be increased via a position of the coolant chamber 330 relative to the recess 316. A combination of the coolant chamber 330 and the recess 316 may comprise a teardrop and/or bean shape.

The coolant chamber 330 may comprise a plurality of protrusions 340. The plurality of protrusions 340 may be arranged along one or more surfaces of the second portion 320. In one example, the plurality of protrusions 340 are arranged along only the inner surface 322. Despite a curvature of the inner surface 322, the plurality of protrusions 340 may extend in a direction substantially parallel to the central axis 292.

The plurality of protrusions 340 may extend circumferentially about the inner surface 322. Adjacent protrusions of the plurality of protrusions 340 may be spaced apart from one another such that they may not touch. Diameters of the plurality of protrusions 340 may increase in the downstream direction such that a most upstream protrusion may comprise a diameter less than a downstream protrusion. The plurality of protrusions 340 may increase a surface of the compressor housing 300 that experiences cooling, thereby increasing a cooling effect provided by coolant in the coolant chamber 330.

Turning now to FIG. 3B, it shows an embodiment 350 of the compressor housing 300 in an assembled arrangement. That is to say, the first portion 310 may be coupled to the second portion 320. The first portion 310 may be physically coupled to the second portion 320 via one or more bolts. A sealing ring may be positioned therebetween if desired. In some examples, additionally or alternatively, the first portion 310 may be mated to the second portion 320 via one or more of welds, adhesives, and fusions. In some examples, the first portion 310 may be press fit into the second portion 320.

The back plate 200 of FIG. 2A may be combined with the compressor housing 300 at the opening 314 of the first portion 310. The second portion 220 of the back plate 200 may be coupled to the first portion 310 at the opening 314. The second portion 220 may be physically coupled to the first portion 310 via one or more of bolts, welds, fusions, and adhesives. In some examples, the second portion 220 may be press fit into the first portion 310.

The coolant chamber 230 of the second portion 220 may be in fluid communication with the coolant chamber 330 in some examples. The fluid communication may be direct such that there is a passage directly connecting the coolant chamber 230 to the coolant chamber 330 allowing coolant to flow therebetween. Additionally or alternatively, the coolant chamber 230 may not be in direct fluid communication with the coolant chamber 330. However, each of the coolant chambers 230 and 330 may receive coolant from a common coolant source including a cylinder coolant jacket, radiator, or the like.

In this way, a compressor may comprise a coolant chamber between it and a turbine and between a compressor blade and a volute. By comprising one or more coolant chambers, oil coking and other negative effects experience by high compressor temperatures may be mitigated. In this way, a compressor efficiency may be maintained. Additionally, a shape of the back plate and compressor housing may allow the coolant chambers to be easily introduced to newly manufactured compressors and/or pre-existing compressors. Despite an increase in a number of pieces, a packaging size of the compressor is maintained relative to a single piece back plate or a single piece compressor housing while enabling the back plate and housing to include a coolant chamber. The two pieces may be fastened together without demanding additional mounts of other supports.

Turning now to FIG. 4A, it shows an embodiment of a compressor housing 400. The compressor housing 400 may be used as a housing for the compressor 162 of FIG. 1. Additionally or alternatively, the compressor housing 400 and the back plate 200 of FIGS. 2A and 2B may be used in conjunction with a single compressor, such as the compressor 162 of FIG. 1 without departing from the scope of the present disclosure.

The compressor housing 400 may be substantially similar to the compressor housing 300 of FIG. 3A, except that the compressor housing 400 comprises a first portion 410 and a second portion 420 that may be shaped slightly differently than the first portion 310 and the second portion 320. More specifically, the second portion 420 may comprise an elongated portion 428 extending from an inner surface 422 of the second portion 420. The elongated portion 428 may comprise a cylindrical shape. The elongated portion 428 may further comprise an opening 429 between it and an outer surface 424 through which a cooling chamber 430 may fluidly couple with a recess 416 of the first portion 410. Similar to the second portion 320, the inner surface 422 may meet with the outer surface 424 at an extreme end 426.

Additionally, the first portion 410 may differ from the first portion 310 of FIG. 3A in that the first portion 410 comprises an indentation 418, wherein the indentation 418 may be shaped to receive the elongated portion 428 of the second portion 420. The indentation 418 may decrease a size of the recess 416 such that the recess 416 is smaller than the recess 316 of FIG. 3A. However, a volume of the coolant chamber 430 may be similar to the volume of the coolant chamber 330 of FIG. 3B when the first portion 410 and the second portion 420 are mated.

Thus, the compressor housing 400 comprises an inlet 402 and a volute 404 and an outlet 406 similar to the inlet 302 and volute 304 and outlet 306 of FIG. 3A. The first portion 410 comprise an extreme end 412 and an opening 414 similar to the extreme end 312 and opening 314.

Turning now to FIG. 4B, it shows an embodiment 450 of the first portion 410 physically coupled to the second portion 420. The elongated portion 428 may mate with the indentation 418 of the first portion 410 such that the two pieces are relatively indistinguishable. The elongated portion 428 and the indentation 418 may be correspondingly shaped such that when the two are mated, surfaces formed therewith are flush and do not protrude into a compressor inlet 402 or the cooling chamber 430.

The outer surface 424 may contact a surface of the first portion 410 to seal the opening 429 such that coolant may not escape the coolant chamber 430 from a location corresponding to the opening 429.

It will be appreciated that due to the extreme end 412 and the opening 414 being shaped similarly to the extreme end 312 and opening 414, the compressor housing 400 may also be combined with the back plate 200 to shape a compressor comprising two coolant chambers, coolant chamber 230 and coolant chamber 430.

Turning now to FIG. 5, it shows a plot 500 illustrating a compressor efficiency for a previous example of a compressor without a coolant chamber or with a coolant chamber free of ribs, protrusions, and/or indentations. The plot 500 further illustrates a compressor efficiency for a compressor comprising one or more of the back plate 200 of FIGS. 2A and 2B and/or the compressor housing 300 or 400 of FIGS. 3A and 4A respectively. Plot 502 may represent the previous example of a compressor without cooling and plot 504 may represent a compressor including the cooling chamber described above with respect to one or more of FIGS. 2A through 4B. Plot 506 may represent another previous example of a compressor comprising cooling but free of the fins illustrated above with respect to FIGS. 2A through 4B.

Plot 502 initially begins with a compressor efficiency of similar to 0.75. However, as the compressor is used for an amount of time similar to 10 hours, the compressor efficiency begins to decrease. The compressor efficiency of the previous compressor example continues to decrease to 0.65 after approximately 60 hours of usage. Thus, the previous compressor example may decrease in efficiency over 13%.

Plot 506 initially begins with a compressor efficiency similar to 0.75. However, as the compressor is used for an amount of time similar to 20 hours, the compressor efficiency decreases to 0.70. After 40 hours of usage, the compressor efficiency remains equal to about 0.68 to 0.69.

Plot 504 initially begins with a compressor efficiency of similar to 0.75. The compressor efficiency fluctuates as it is used between 0.72 and 0.73 through an entire duration of time illustrated by plot 500. Thus, the compressor equipped with the divided coolant chamber comprising the plurality of fins and/or protrusions may experience less than a 1% drop in efficiency for at least 80 hours of usage.

In one example, the divided coolant chamber associated with the compressor of plot 504 may decrease a compressor outlet temperature by 40 to 50° C., whereas the coolant chamber of the compressor associated with plot 506 may decrease a compressor outlet temperature by 20 to 25° C. This enhanced cooling may mitigate oil coking, allow higher boost pressures to be achieved, decrease heat transfer from a turbine to the compressor, and decrease manufacturing costs. Casting an enclosed coolant chamber inside a compressor housing of the previous example of compressors may be difficult and expensive. By dividing the compressor housing and/or back plate to include a coolant chamber, costs may be reduced.

Figure 6:
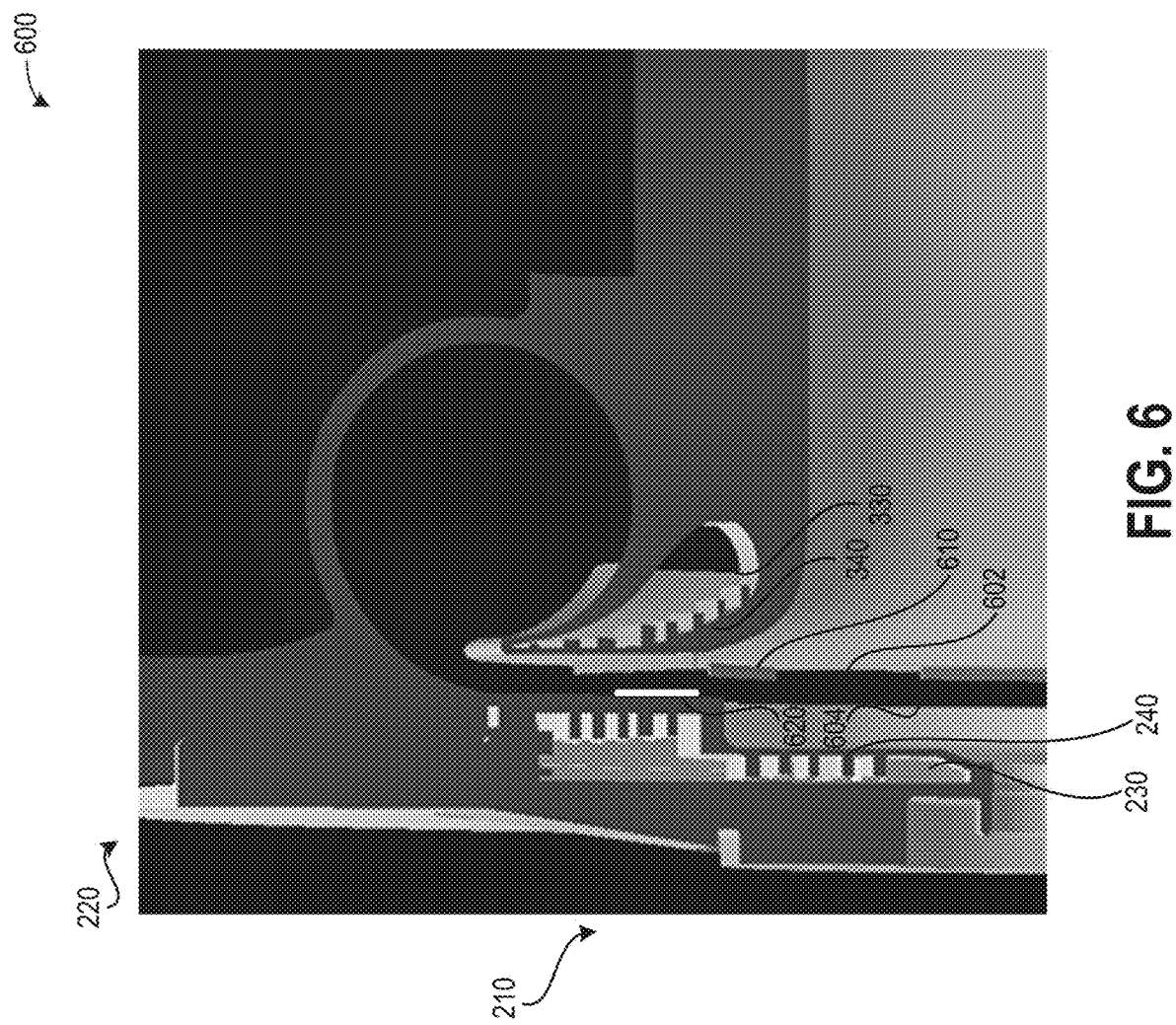
FIG. 6 shows an embodiment of the first and second embodiments combined and optionally including vanes on a shroud side of the compressor.

Turning now to FIG. 6, it shows a combined embodiment of a compressor 600 of the first embodiment of FIGS. 2A and 2B being combined with the second embodiment of FIGS. 3A and 3C. As such, components previously introduced may be similarly numbered and not reintroduced for reasons of brevity. The combined embodiment optionally comprises one or more first vanes 610 arranged on a diffuser shroud surface 602. In one example, the vanes 610 on the diffuser shroud surface 602 is between the the diffuser shroud surface 602 and a hub surface 604. In one example, the hub surface 604 is a surface of a second portion of the back plate and the diffuser shroud surface is a surface of a second portion of the compressor housing. The combined embodiment may further comprise second vanes 620 arranged on the diffuser hub surface 604.

The first vanes 610 may be substantially identical to the second vanes 620 in one or more of size, shape, orientation, and number. In some examples, only the first vanes 610 may be present. In other examples, only the second vanes 620 may be present. The first vanes 610 may correspond to the cooling chamber 330 and the second vanes 620 may correspond to the cooling chamber 230. As such, the first vanes 610 may enhance the cooling effect of the cooling chamber 330 and the second vanes 620 may enhance the cooling effect of the cooling chamber 230.

The vanes 610 and 620 may extend into a region of the compressor between the cooling chamber 330 and a compressor blade. The vanes 610 and 620 may be oriented such that they extend in a tangential direction relative to a compressor throat (e.g., opening from a compressor inlet to the compressor blade). The vanes 610 and 620 may protrude from the diffuser shroud surface 602 and the diffuser hub surface 604, respectively, without adversely affecting flow. The vanes 610 and 620 may increase cooling as they provide a greater surface area being cooled by the coolant in the coolant chamber 330 and may increase a compressor surge margin. In some examples, the vanes 610 and 620 may comprise a height between _5 to 50% of the distance between the diffuser hub and shroud surface. In some examples, the vanes 610 and 620 may comprise a height between 10 to 40% of the distance between the diffuser hub and shroud surfaces. In one example, the vanes 610 and 620 may comprise a height equal to 25% of the distance between the diffuser hub and shroud surfaces.

The vanes 610 may be rectilinear in one example. Additionally or alternatively, the vanes 610 may be arc-shaped or other curved shape. Additionally or alternatively, the vanes 610 may comprise a cross-section taken in a radial direction comprising a triangular, square, rectangular, pentagonal, dome, or other similar shape. A number of vanes 610 may be greater than two and less than twenty. In some examples, the number of vanes 610 is less than 10. In one example, the number of vanes is equal to exactly 8. The vanes 610 may enhance the cooling effect of the cooling chambers and the corresponding fins and/or protrusions of each such that a compressor efficiency is maintained. In some examples, additionally or alternatively, the cooling chambers may be free of fins when the vanes 610 and/or 620 are arranged on the diffuser shroud and hub surfaces while still maintaining a desired cooling to maintain a compressor efficiency.

In this way, a compressor comprising a compressor housing and/or back plate shaped to comprise a divided coolant chamber may maintain its efficiency due to decreased oil coking relative to other compressors. The divided coolant chamber may be manufactured comprising a first portion shaped to seal an interior volume of a second portion, wherein the interior volume may function as a coolant chamber. The coolant chamber may further comprise a plurality of fins, protrusions, and/or other irregularities arranged on surfaces of the second portion corresponding to the coolant chamber to increase a cooling effect of the coolant chamber. The technical effect of increasing the cooling effect of the coolant chamber of the compressor is to block oil coking, which may maintain a compressor efficiency and an engine efficiency. By doing this, emissions may be reduced and engine power output may be maintained.

An embodiment of a system comprises a compressor comprising a cooling element divided into a first portion and a second portion, wherein the first portion is a cap and the second portion comprises a coolant chamber comprising a plurality of fins. A first example of the system further includes where the first and second portions mate to shape a back plate. A second example of the system, optionally including the first example, further includes where the first and second portions mate to shape a compressor housing. A third example of the system, optionally including the first and/or second examples, further includes where the first portion is a back plate first portion and the second portion is a back plate second portion, further comprising a compressor housing first portion and a compressor housing second portion, and where the cooling element is a first cooling element, the compressor further comprising a second cooling element, wherein the first cooling element corresponds to the back plate first and second portions and the second cooling element corresponds to the compressor housing first and second portions. A fourth example of the system, optionally including one or more of the first through third examples, further includes where the plurality of fins is arranged outside or inside of the cooling chamber. A fifth example of the system, optionally including one or more of the first through fourth examples, further includes where the first portion is bolted to the second portion with a sealing ring arranged therebetween.

An embodiment of a compressor comprising a coolant chamber shaped via a first portion and a second portion, wherein the first portion seals the coolant chamber and the second portion comprises a plurality of fins extending into a volume of the coolant chamber. A first example of the compressor further includes where the first portion and the second portion mate to form a back plate, and where the coolant chamber is arranged interior to surfaces of the back plate. A second example of the compressor, optionally including the first, further includes where the second portion is further shaped to receive a compressor blade. A third example of the compressor, optionally including the first and/or second examples, further includes where the first portion and the second portion mate to form a compressor housing, and where the coolant chamber is arranged between a volute and a compressor blade. A fourth example of the compressor, optionally including one or more of the first through third examples, further includes where the coolant chamber is a first coolant chamber, further comprising a second coolant chamber, the first coolant chamber is arranged in a back plate downstream of a compressor blade and the second coolant chamber is arranged in a compressor housing upstream of the compressor blade relative to a direction of intake air flow. A fifth example of the compressor, optionally including one or more of the first through fourth examples, further includes where the first coolant chamber comprises a first plurality of fins and the second coolant chamber comprises a second plurality of fins. A sixth example of the compressor, optionally including one or more of the first through fifth examples, further includes where the plurality of fins extends in a direction parallel to a direction of intake air flow. A seventh example of the compressor, optionally including one or more of the first through sixth examples, further includes where each fin of the plurality of fins is circular and is radially spaced away from an adjacent fin. An eighth example of the compressor, optionally including one or more of the first through seventh examples, further includes where each fin of the plurality of fins comprises a rectangular shape along a cross-section taken along a direction parallel to a direction of intake air flow.

An embodiment of a system comprises a turbine and a compressor arranged along a common shaft, the compressor comprising a back plate arranged between the compressor and the turbine, the back plate comprising a first back plate portion and a second back plate portion adapted to physically couple and shape a first coolant chamber formed therebetween, the compressor further comprising a compressor housing, the compressor housing comprising a first housing portion and a second housing portion adapted to physically coupled and shape a second coolant chamber formed therebetween. A first example of the system further includes where the second back plate portion is shaped to physically couple with an extreme end of the first housing portion, and where a diffuser hub surface of the second back plate portion faces a diffuser shroud surface of the second housing portion, and where one or more of the diffuser hub surface and diffuser shroud surface comprise vanes. A second example of the system, optionally including the first example, further includes where a compressor blade is arranged between the second back plate portion and the second housing portion, and where the compressor blade is physically coupled to the back plate. A third example of the system, optionally including the first and/or second examples, further includes where the second coolant chamber is arranged between the compressor blade and a compressor volute. A fourth example of the system, optionally including one or more of the first through third examples, further includes where each of the first coolant chamber and the second coolant chamber comprise a plurality of protrusions.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A system comprising:
a compressor comprising a cooling element divided into a first portion and a second portion, wherein the first portion is a solid continuous cap free of passages and the second portion comprises a coolant chamber comprising a plurality of fins,
wherein the first portion is a back plate first portion and the second portion is a back plate second portion, further comprising a compressor housing first portion and a compressor housing second portion, and wherein the cooling element is a first cooling element, the compressor further comprising a second cooling element, wherein the first cooling element corresponds to the back plate first and second portions and the second cooling element corresponds to the compressor housing first and second portions.
2. The system of claim 1, wherein the first and second portions mate to shape a back plate.
3. The system of claim 1, wherein the first and second portions mate to shape a compressor housing.

4. The system of claim 1, wherein the plurality of fins is arranged outside or inside of the coolant chamber.

5. The system of claim 1, wherein the first portion is coupled to the second portion with a sealing ring arranged therebetween.

6. A compressor comprising:
a coolant chamber shaped via a first portion and a second portion, wherein the first portion is a solid continuous piece that seals the coolant chamber and comprises no passages, and the second portion comprises a plurality of fins extending into a volume of the coolant chamber, wherein the coolant chamber is a first coolant chamber, further comprising a second coolant chamber, and wherein the first coolant chamber is arranged in a back plate downstream of a compressor blade and the second coolant chamber is arranged in a compressor housing upstream of the compressor blade relative to a direction of intake air flow.

7. The compressor of claim 6, wherein the first portion and the second portion mate to form a back plate, and wherein the coolant chamber is arranged interior to surfaces of the back plate.

8. The compressor of claim 7, wherein the second portion is further shaped to receive a compressor blade.

9. The compressor of claim 6, wherein the first portion and the second portion mate to form a compressor housing, and wherein the coolant chamber is arranged between a volute and a compressor blade.

10. The compressor of claim 6, wherein the first coolant chamber comprises a first plurality of fins and the second coolant chamber comprises a second plurality of fins.

11. The compressor of claim 6, wherein the plurality of fins extends in a direction parallel to a direction of intake air flow.

12. The compressor of claim 6, wherein each fin of the plurality of fins is circular and is radially spaced away from an adjacent fin.

13. The compressor of claim 6, wherein each fin of the plurality of fins comprises a rectangular shape along a cross-section taken along a direction parallel to a direction of intake air flow.

14. A system comprising:
a turbine and a compressor arranged along a common shaft, the compressor comprising a back plate arranged between the compressor and the turbine, the back plate comprising a first back plate portion and a second back plate portion adapted to physically couple and shape a first coolant chamber formed therebetween, wherein the first back plate portion is a solid continuous piece free of passages, and the compressor further comprising a compressor housing, the compressor housing comprising a first housing portion and a second housing portion adapted to physically couple and shape a second coolant chamber formed therebetween.

15. The system of claim 14, wherein the second back plate portion is shaped to physically couple with an extreme end of the first housing portion, wherein a diffuser hub surface of the second back plate portion faces a diffuser shroud surface of the second housing portion, and wherein one or more of the diffuser hub surface and the diffuser shroud surface comprise vanes.

16. The system of claim 15, wherein a compressor blade is arranged between the second back plate portion and the second housing portion, and wherein the compressor blade is physically coupled to the back plate.

17. The system of claim 16, wherein the second coolant chamber is arranged between the compressor blade and a compressor volute.

18. The system of claim 14, wherein each of the first coolant chamber and the second coolant chamber comprises a plurality of protrusions.

* * * * *